United States Patent [19]

Falk et al.

[11] Patent Number: 5,010,505

[45] Date of Patent: Apr. 23, 1991

[54] OPTICAL CROSS BAR ARITHMETIC/LOGIC UNIT

[75] Inventors: R. A. Falk, Renton; C. D. Capps; T. L. Houk, both of Seattle, all of Wash.

[73] Assignee: The Boeing Company, Seattle, Wash.

[21] Appl. No.: 19,761

[22] Filed: Feb. 27, 1987

[51] Int. Cl.$^5$ .............................................. G06E 1/04
[52] U.S. Cl. ..................................... 364/713; 364/746
[58] Field of Search ............... 364/713, 746; 350/96.1, 350/96.11

[56] References Cited

U.S. PATENT DOCUMENTS

| | | | |
|---|---|---|---|
| 3,680,080 | 7/1972 | Maure | 364/713 |
| 3,996,455 | 12/1976 | Schaefer et al. | 364/713 |
| 4,064,400 | 12/1977 | Akushsky et al. | 364/746 |
| 4,121,298 | 10/1978 | Akushsky et al. | 364/746 |
| 4,363,106 | 12/1982 | Tai | 364/713 |
| 4,569,033 | 2/1986 | Collins et al. | 364/845 |

OTHER PUBLICATIONS

Seko, "All-Optical Parallel Logic Operation Using Fiber Laser Plate for Digital Image Processing" *Appl. Phys. Lett.* Aug. 1, '80, pp. 260-262.

Schaeffer et al., "Tse Computers" *Proceedings of the IEEE*, vol. 65, No. 1, Jan. '77, pp. 129-138.

Collins, Jr. et al., "Optical Logic Gates Using a Hughes Liquid Crystal Light Valve" *International Optical Computing Conference* (1980) pp. 168-173.

Jameson et al., "Logic Operation Using a Bistable Etalon with Two Control Beams" *IEEE J. of Quantrum Electronics*, vol. QE-21, No. 9, Sep. 1985, pp. 1348-1351.

Residue Arithmetic Techniques for Optical Processing of Adaptive Phased Array Radars, Beaudet et al., Applied Optics, 15 Sep. 1986.

Residue-Based Optical Processor, Horrigan et al., Optical Processing Systems (1979).

*Primary Examiner*—David H. Malzahn
*Attorney, Agent, or Firm*—Foley & Lardner

[57] ABSTRACT

An optical cross bar technique for logic and arithmetic operations utilizes crossed optical paths of light configured to define intersecting regions with each other corresponding to truth table or multi-level logic table inputs. The intensity of light at each intersecting region is discriminated to determine if two units of light intensity are present at each intersection, thereby indicating a particular logic state.

26 Claims, 5 Drawing Sheets

FIG. 3a.
| $X_2 \backslash X_1$ | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |
FIG. 3b.
| $X_2 \backslash X_1$ | 0 | 1 | 2 | 4 | 3 |
|---|---|---|---|---|---|
| 0 | 0 | 0 | 0 | 0 | 0 |
| 1 | 0 | 1 | 2 | 4 | 3 |
| 2 | 0 | 2 | 4 | 3 | 1 |
| 4 | 0 | 4 | 3 | 1 | 2 |
| 3 | 0 | 3 | 1 | 2 | 4 |
FIG. 4a.
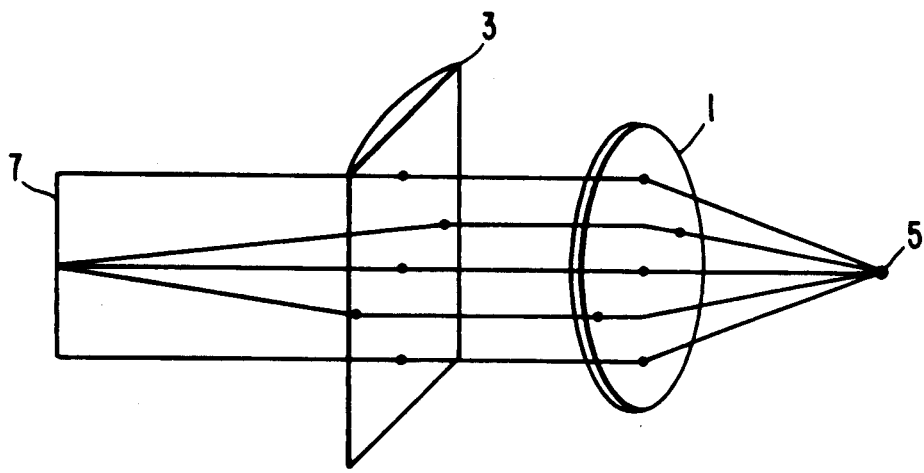
FIG. 4b.
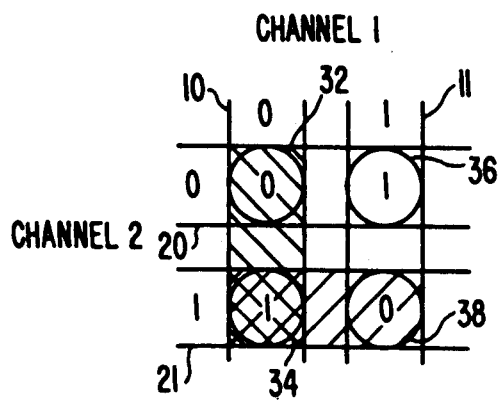

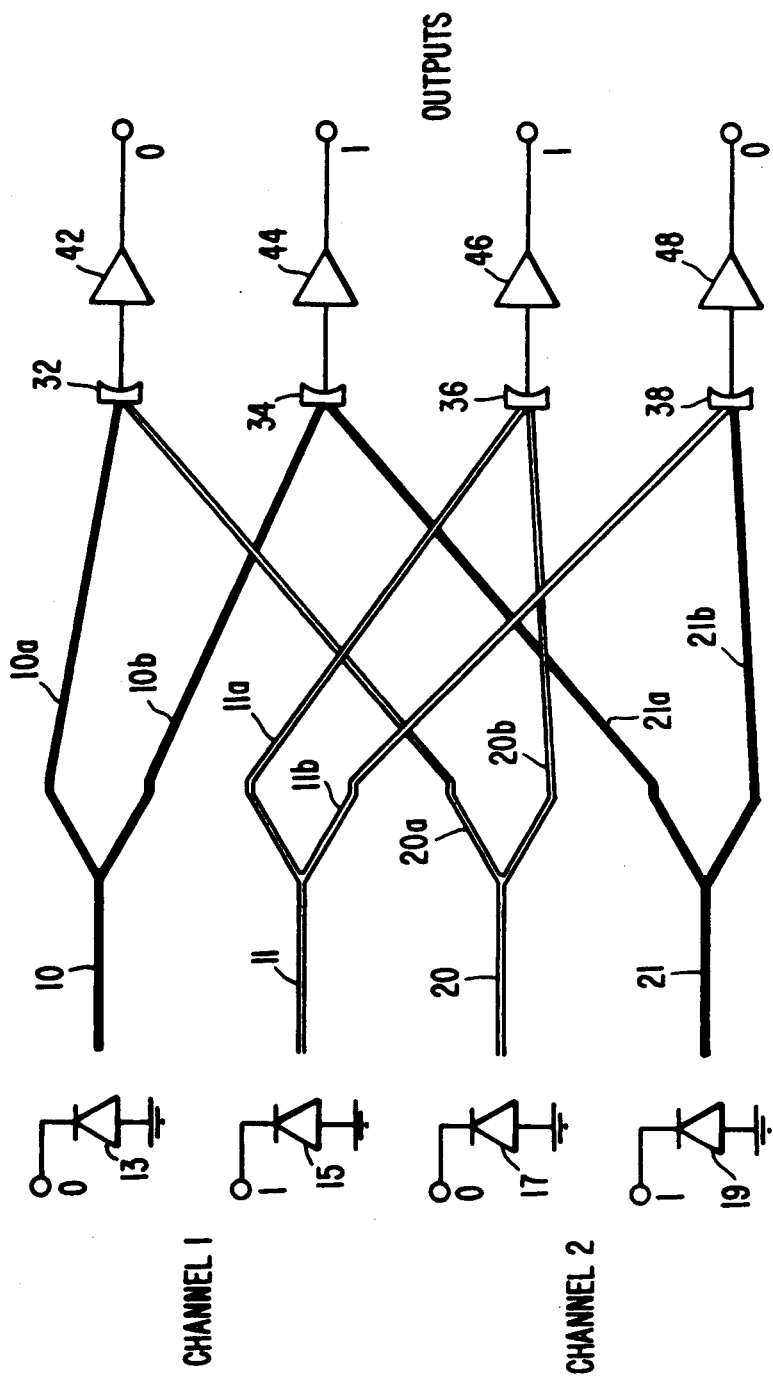

OPTICAL CROSS BAR ARITHMETIC/LOGIC UNIT

BACKGROUND OF THE INVENTION

This invention relates generally to optical information processing and, in particular, to an optical cross bar technique for performing parallel optical logic and arithmetic operations.

There is a fundamental difference between optical circuits, in which the information carriers are photons, and electronic circuits, where the carriers are electrons. In the former case the carriers do not interact with each other, while in the latter they do. This means that in optical devices there exist interconnect possibilities that do not exist with electronic hardware, in particular, interconnected parallel architectures. The invention described herein uses this type of architecture to perform digital arithmetic and logic operations in a completely parallel, single step process. After the inputs are switched on, the output appears in the time it takes a photon to transit the device. No faster computation time is possible.

The invention described herein relies on a mathematical framework similar to that described in the application of C.D. Capps and R.A. Falk, entitled "Parallel Optical Arithmetic/Logic Unit", Ser. No. 019,767, filed concurrently herewith and incorporated herein by reference. The above mentioned disclosure incorporates parallel optical Fourier transform pattern recognition to determine the spacing between the two lighted sources of a linear set of equidistant, coherent point sources. Using a set of $(2n-1)$ recognition filters and thresholds, this technique provides for the determination of the elements of any n by n logic truth table that can be permuted to be anti-diagonal. In particular, residue addition and multiplication can be performed.

Briefly, the aforementioned capabilities lie in the fact that residue arithmetic does not have a "carry" operation; that is, each "bit" in the representation is independent of the other. Thus, for example, addition in residue arithmetic of corresponding "bits" in two numbers can effectively be carried out by a device that is not connected to other "bits", but parallel to other bits. In residue arithmetic, each "bit" in a representation of a number is the decimal value of the number modulo the prime number corresponding to that position, called the "radix". However, never before has there been an optical computing technique that takes advantage of the properties of residue arithmetic and obviates the need for any lenses or filters.

Two dimensional optical computers have been proposed by Schaefer et al in U.S. Pat. No. 3,996,455. Schaefer et al perform arithmetic operations on a pair of matrices whereby an output plane is used to project a two dimensional image whose pattern is indicative of an output state. However, detection of this two dimensional pattern is critical to the correct operation of the computer. Additionally, Schaefer et al disclose only binary coding of data which will not allow one step, parallel processing of a single arithmetic function in residue arithmetic.

SUMMARY OF THE INVENTION

Accordingly, it is an object of the present invention to provide a method and apparatus for performing parallel optical logic and arithmetic operations without requiring lenses and filters.

It is a further object of the present invention to provide a single step method and apparatus of optical computing for generating a result of a logic or arithmetic operation.

It is still a further object of the present invention to provide a method and apparatus that will operate effectively with coherent or incoherent light.

Other objects and advantages of this invention will become more apparent hereinafter in the specification and the drawings.

The present invention uses crossed optical paths of light to represent truth table inputs and computes the table value in a single step by determining the intensity of light at the intersection of two optical paths. The technique eliminates the need for lenses and filters, and will function with both coherent and incoherent light inputs. This technique uses $n^2$ non-linear threshold elements to evaluate an n by n truth table. Since typical values of n will be less than 30 (adequate for residue representation of 32 bit numbers, for example) the number of required threshold elements is readily produced by modern thin film fabrication methods.

BRIEF DESCRIPTION OF THE DRAWINGS

FIGS. 3a and 3b show a radix 5 residue multiplication table and its permuted table, respectively; FIGS. 4a and 4b show a first optical embodiment of an EXCLUSIVE-OR operation according to the technique of the present invention;

FIG. 5 is a schematic representation of a second optical embodiment of an EXCLUSIVE-OR operation according to the technique of the present invention;

DETAILED DESCRIPTION OF THE EMBODIMENTS

Figures 1, 2A, 2B, 2C:
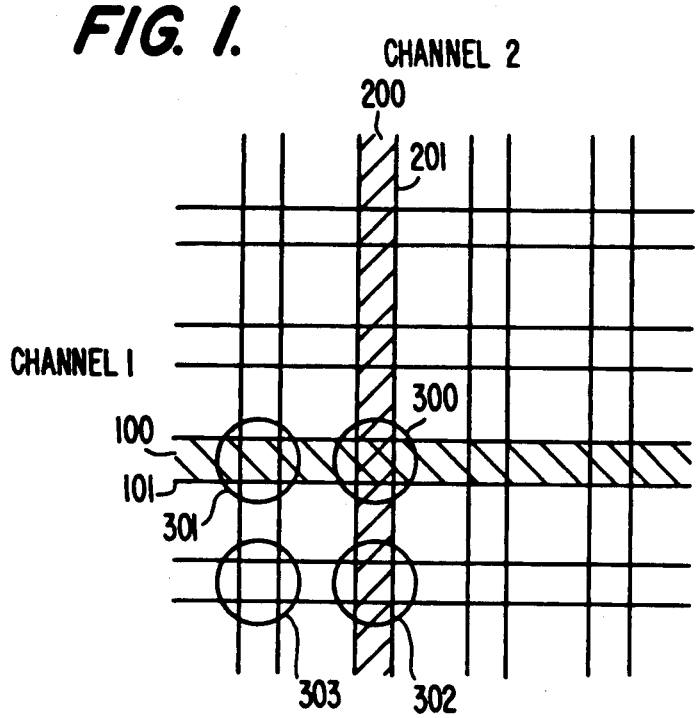
FIG. 1 is a schematic drawing showing the basic concept of the optical cross bar arithmetic/logic unit according to the present invention.
FIGS. 2a-2c show examples of possible truth tables that can be achieved by the present invention.

Referring now more particularly to FIG. 1, the basic concept of the optical cross bar arithmetic/logic unit (ALU) according to the present invention is shown using a 4×4 ALU. Input 100 from Channel 1 and input 200 from Channel 2 transmit light in optical paths 101 and 201 respectively to intersect at a region designated by reference number 300. Inputs 100 and 200 may comprise light sources coupled directly or indirectly to the optical paths 101 and 201 respectively. Thus, the level of light intensity at intersection region 300 is equivalent to two units of light. In comparison, the level of light intensity detected at intersecting regions 301 and 302 is only one unit of light, and the level of light intensity detected at intersecting region 303 is zero.

Some examples of possible truth tables that can be realized by the present invention are shown in FIGS. 2 and 3. FIGS. 2a and 2b show examples of the kinds of two level logic tables associated with standard Boolean algebra, the AND and EXCLUSIVE-OR tables respectively. FIG. 2c shows an example of a multi-value logic table, specifically showing a table for radix 3 residue addition. The lack of carry operations is apparent, and thus makes parallel processing of residue addition possible. FIG. 3a shows a radix 5 residue multiplication table and FIG. 3b indicates how the reduced table (with zeros removed) can be made anti-diagonal via permutation, as discussed by Szabo and Tanaka in *Residue Arithmetic and its Applications to Computer Technology*, McGraw-Hill, New York, 1977 and incorporated herein by reference. These tables are representative examples only as it is apparent that all possible multi-level logic tables can be constructed in a similar fashion.

Devices to evaluate all of these tables using the optical cross bar technique can be constructed. However, the following descriptions of physical embodiments will concentrate first on the EXCLUSIVE-OR operation for simplicity. The extension to multilevel logic, with emphasis on residue arithmetic, will then be shown.

A first possible optical embodiment of the EXCLUSIVE-OR operation is shown in FIG. 4. As indicated in FIG. 4a, a spherical lens 1 in combination with a cylindrical lens 3 can be used to convert an input point source 5 (such as an LED, LD, etc.) into a line 7 of light. This line 7 can be used as one of four cross bar inputs in a spatial pattern of horizontal and vertical line images transmitted along optical paths 20, 21 and 10, 11 respectively, as shown in FIG. 4b. Detectors 32, 34, 36 and 38 placed at the intersecting regions of the optical paths will see either 0, 1, or 2 units of light (equal input powers assumed) when one optical path from each channel is transmitting. In the example of FIG. 4b, a line light image is transmitted along path 10 of Channel 1 (corresponding to a logic "0" state) and along path 21 of Channel 2 (corresponding to a logic "1" state). The detector 34 detects the double light intensity corresponding to the correct output of the EXCLUSIVE-OR operation. Electronic thresholding may be used as a method of discriminating the correct intensity levels and thus the correct output or desired answer for the logical operation.

A second possible optical embodiment of the EXCLUSIVE-OR operation is shown in FIG. 5. This embodiment is equivalent to that shown in FIG. 4, except that fiber optics for detector illumination replace lenses 1 and 3 used in FIG. 4a and thereby form the optical paths 10, 11, 20 and 21. Each optical path 10, 11, 20 and 21 defined by the fiber optics is split into two individual optical paths also defined by the fiber optics, as shown, for example, by paths 10a and 10b for optical path 10. As shown in the example of FIG. 5, paths 10a and 10b direct transmitted light from an LED 13 towards detectors 32 and 34 respectively. Paths 21a and 21b direct transmitted light from an LED 19 towards detectors 34 and 38 respectively. LED's 15 and 17 are used for directing light along paths 11a, 11b and 20a and 20b to respective detectors 36, 38 (for LED 15) and 32, 36 (for LED 17). Assuming for the representative EXCLUSIVE-OR operation that only LED's 13 and 19 are energized, light from paths 10b and 21a are crossed at detector 34 whereby detector 34 detects two units of light to be discriminated by threshold unit 44. Threshold units 42, 46 and 48 are likewise connected to their corresponding detectors 32, 36 and 38, respectively. A significant advantage of the implementation in FIG. 5 is reduced alignment sensitivity and increased ease of packaging.

Figure 6:
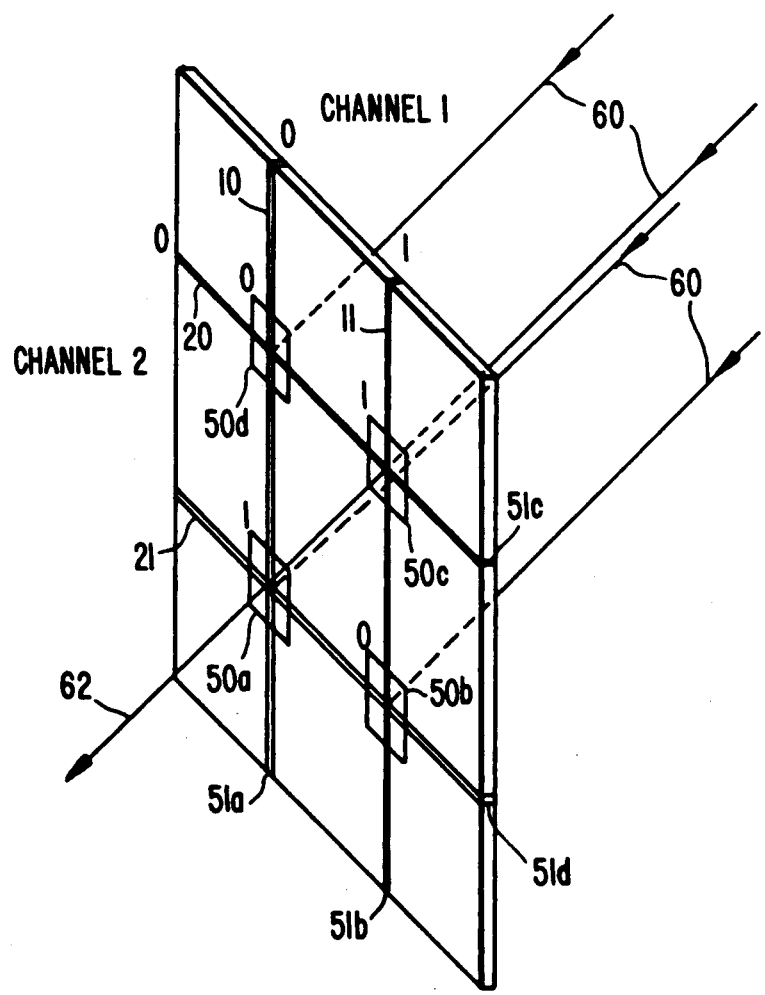
FIG. 6 is a schematic representation of a third optical embodiment of an EXCLUSIVE-OR operation according to the technique of the present invention.

A third optical embodiment of the EXCLUSIVE-OR operation is shown in FIG. 6 and utilizes integrated optics. In this form, optical waveguides 51a–51d define optical paths 10, 11, 20 and 21 respectively, and are made to intersect at optical bistable devices 50a–50d as shown. The optical bistable devices 50a–50d are non-linear devices which can perform an AND operation, i.e., they only turn on when two light inputs are present. In the example shown, the bistable device 50c permits the transmission of light, indicated by arrows 62, from a sampling beam designated by arrows 60 only when an intersecting region of the device 50c has two units of light crossing. For the example shown, this will only occur where path 11 intersects path 20. Equivalent outputs, such as those found at bistable devices 50a and 50c, can be combined at this point using standard optical techniques. Of course, other integrated optics packages are clearly possible, including types that are similar to the fiber optics version in FIG. 4, i.e., detector/threshold means are used for the AND operation. Furthermore, the improved packaging and increased speed (due to decreased size) of an integrated optics design are readily apparent.

Figure 7:
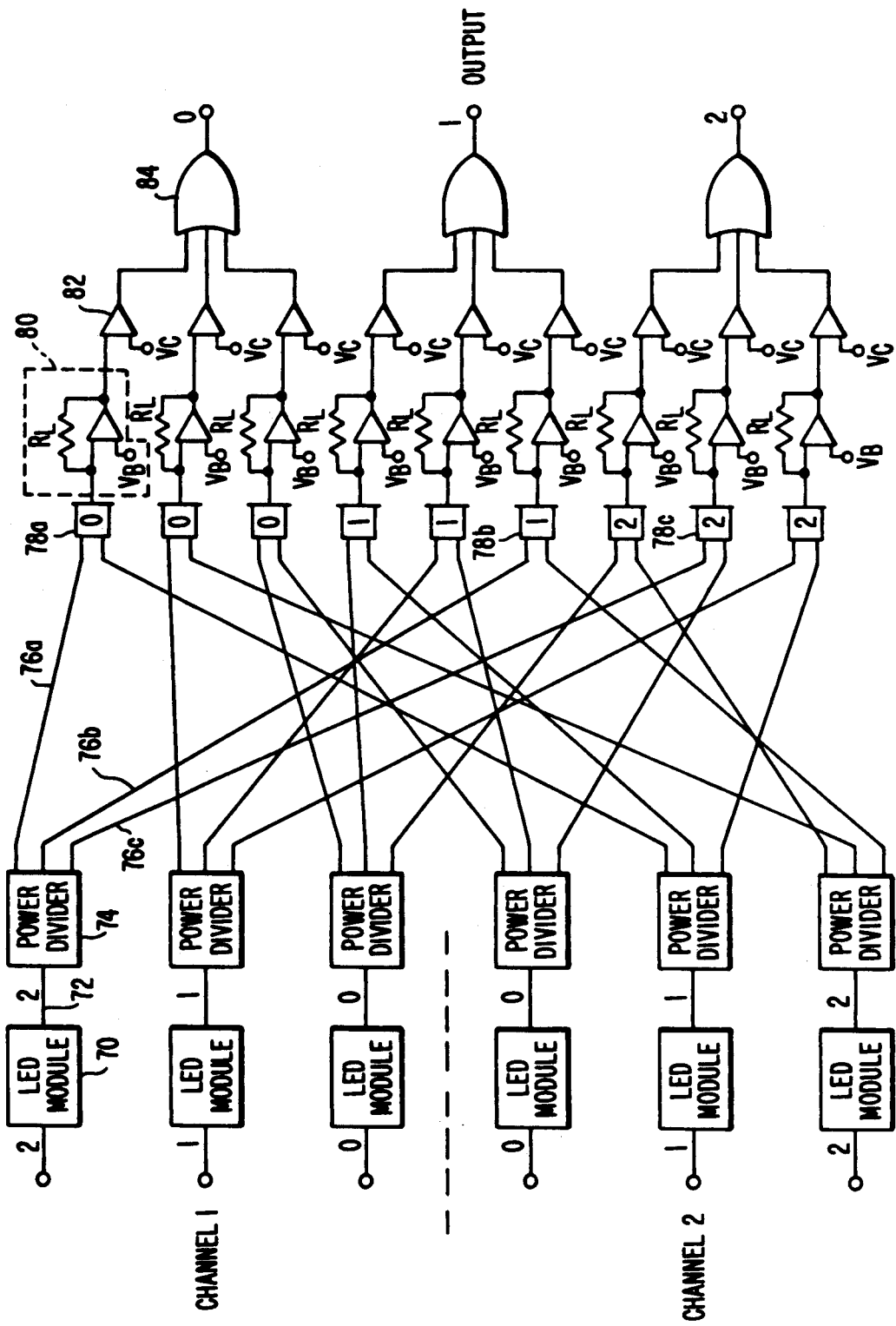
FIG. 7 is a schematic representation of an optical radix 3 adder according to the technique of the present invention.

The extension of the above embodiments from binary to multi-level logic is straightforward and will now be explained. An example of a fiber optic radix 3 adder for realizing the multi-value logic table of FIG. 2c is shown in FIG. 7. For the sake of simplicity, the configuration will be described in detail only with respect to one input of Channel 1. The remainder of the inputs of Channel 1 and Channel 2 are identical. LED module 70 transmits light through an optical fiber 72 to a power divider 74 where the intensity of the transmitted light is divided equally between optical fibers 76a, 76b and 76c. Fibers 76a, 76b and 76c define optical paths leading to detectors 78a, 78b and 78c respectively. Each of the detectors 78a, 78b and 78c also receives a second optical path from one of the Channel 2 inputs in such a way that the optical paths from Channel 1 and 2 intersect. Each of the detectors 78a–78c is indicative of a result in the multi-level logic table shown in FIG. 2c.

Applying the technique of the present invention, when one optical path from Channel 1 is transmitting light and intersects an optical path from Channel 2 that is also transmitting light, two units of light intensity will be detected by the respective detector. Discrimination is achieved by amplifying an electrical signal indicative of the two units of light intensity at the respective amplifier circuit 80 and comparing the amplified signal with a reference voltage $V_c$ at a respective comparator 82. Thus, whenever an intersection contains two units of light the output of the respective comparator 82 will be set high. This high input is in turn OR'ed at a respective OR gate 84, thereby yielding the correct multi-level logic table output. Identical configurations can be used to compute other multi-level logic tables, including radix multiplication, by simply reassigning the outputs according to the permuted logic table as shown, for example, in FIG. 3b.

Note that both the integrated optics (FIG. 6) and the optical and electronic (FIG. 7) embodiments will achieve the desired result, although the integrated optics version utilizing the cross bar technique is able to operate at significantly higher speeds. The R-C time constants of the electronic interconnects shown in FIG. 7 will limit the response time to values on the order of 1 nsec. However, the speed of the integrated optics device is primarily limited only by the response time of the final non-linear AND operation. The integrated optics configuration would thus permit high speed operation with demonstrated optical bistable switching speeds of 10's of psec (e.g., GaAs multi-quantum well devices).

Finally, the described invention has utility not only in computer applications, but also in certain specialized applications, such as high speed encrypting.

In general, the cross bar optical technique uses $n^2$ non-linear threshold elements to evaluate an n by n truth or multi-level logic table. Since typical values of n will be less than 30 for adequate residue representation of, for example, 32 bit numbers, the number of required threshold elements may be easily produced by current thin film fabrication methods.

Thus, although the invention has been described relative to specific embodiments thereof, it is not so limited, and numerous variations and modifications thereof will be readily apparent to those skilled in the art in light of the above teaching. It is therefore to be understood that within the scope of the appended claims the invention may be practiced otherwise than as specifically described.

What is claimed is:

1. A method of performing arithmetic operations is residue arithmetic, comprising the steps of:
    (a) providing a first and second plurality of light sources, the position of each light source corresponding to the residue of a number modulo a given modulus;
    (b) energizing one of said first plurality of light sources corresponding to the residue of a first number modulo said given modulus;
    (c) energizing one of said second plurality of light sources corresponding to the residue of a second number modulo said given modulus;
    (d) directing light from said energized ones of said light sources to intersect each other in an intersecting region;
    (e) positioning a detector in said intersecting region to receive light from both said energized ones of light sources; and
    (f) discriminating with said detector between:
        (1) a first state, wherein a first level of light intensity is detected resulting from light transmitted to the detector from only one or none of said energized sources, and
        (2) a second state, wherein a second level of light intensity is detected resulting from light transmitted to the detector from both of said energized sources, wherein said first and second states indicate an output state of the arithmetic operation.

2. A method as recited in claim 1, wherein said directing step includes directing light from said energized one of said first plurality of light sources along a first optical path and directing light from said energized one of said second plurality of light sources along a second optical path, perpendicular to said first optical path.

3. Apparatus for performing arithmetic operations in residue arithmetic comprising:
    (a) a first plurality of light sources corresponding in number to N wherein N is a given modulus;
    (b) a second plurality of light sources corresponding in number to N;
    (c) means for energizing a first one of said first plurality of light sources corresponding to the residue of a first number modulo said given modulus;
    (d) means for energizing a second one of said second plurality of light sources corresponding to the residue of a second number modulo said given modulus;
    (e) means for directing light from said first and second energized ones of said light sources to intersect each other in an intersecting region;
    (f) means for detecting light intensity at said intersecting region; and
    (g) means for discriminating at said intersecting region between:
        (1) a first state, wherein a first level of light intensity is detected resulting from light transmitted to the detecting means from only one or none of said first and second energized ones of said light sources, and
        (2) a second state, wherein a second level of light intensity is detected resulting from light transmitted to the detecting means from both of said first and second energized ones of said light sources, wherein said first and second states indicate an output state of the arithmetic operation.

4. An apparatus as recited in claim 3, wherein said light sources are point sources.

5. An apparatus as recited in claim 4, further comprising optical means for forming lines of light wherein each line of light corresponds to one of said energized light sources.

6. An apparatus as recited in claim 5, wherein said optical means comprises a spherical lens in combination with a cylindrical lens.

7. An apparatus as recited in claim 3, wherein said means for directing comprises optical fibers.

8. An apparatus as recited in claim 3, wherein said means for directing comprises wave guides in an integrated optics package.

9. An apparatus as recited in claim 7, wherein said detecting means includes an optical bistable element at said intersecting region.

10. An apparatus as recited in claim 9, further including means for providing a sampling beam of light incident on said intersecting region whereby when said optical bistable element detects said second state, said optical bistable element permits the sampling beam to pass through said intersecting region and otherwise blocks passage of the sampling beam.

11. An apparatus as recited in claim 3, wherein said discriminating means comprises an electronic thresholding means.

12. An apparatus as recited in claim 3, wherein said directing means includes means for directing light from said first and second energized ones of said light sources to intersect perpendicular to each other at said intersecting region.

13. A method of performing logic operations in comprising the steps of:
    (a) providing a first and second plurality of light sources, the position of each light source corresponding to the residue of a number modulo a given modulus;
    (b) energizing one of said first plurality of light sources corresponding to the residue of a first number modulo said given modulus;
    (c) energizing one of said second plurality of light sources corresponding to the residue of a second number modulo said given modulus;
    (d) directing light from said energized ones of said light sources to intersect each other in an intersecting region;

(e) positioning a detector in said intersecting region to receive light from both said energized ones of said light sources; and (f) discriminating with said detector between:
  (1) a first state, wherein a first level of light intensity is detected resulting from light transmitted to the detector from only one or none of said energized sources, and
  (2) a second state, wherein a second level of light intensity is detected resulting from light transmitted to the detector from both of said energized sources, wherein said first and second states indicate an output state of the logic operation.

14. A method as recited in claim 13, wherein said directing step includes directing light from said energized one of said first plurality of light sources along a first optical path and directing light from said energized one of said second plurality of light sources along a second optical path, perpendicular to said first optical path.

15. Apparatus for performing logic operations in residue arithmetic comprising:
  (a) a first plurality of light sources corresponding in number to N wherein N is a given modulus;
  (b) a second plurality of light sources corresponding in number to N;
  (c) means for energizing a first one of said first plurality of light sources corresponding to the residue of a first number modulo said given modulus;
  (d) means for energizing a second one of said second plurality of light sources corresponding to the residue of a second number modulo said given modulus;
  (e) means for directing light from said first and second energized ones of said light sources to intersect each other in an intersecting region;
  (f) means for detecting light intensity at said intersecting region; and
  (g) means for discriminating at said intersecting region between:
    (1) a first state, wherein a first level of light intensity is detected resulting from light transmitted to the detecting means from only one or none of said first and second energized ones of said light sources, and
    (2) a second state, wherein a second level of light intensity is detected resulting from light transmitted to the detecting means from both of said first and second energized ones of said light sources, wherein said first and second state s indicate an output state of the logic operation.

16. An apparatus as recited in claim 15, wherein said light sources are point sources.

17. An apparatus as recited in claim 28, further comprising optical means for forming lines of light wherein each line of light corresponds to one of said energized light sources.

18. An apparatus as recited in claim 17 wherein said optical means comprises a spherical lens in combination with a cylindrical lens.

19. An apparatus as recited in claim 15, wherein said means for directing comprises optical fibers.

20. An apparatus as recited in claim 15, wherein said means for directing comprises wave guides in an integrated optics package.

21. An apparatus as recited in claim 20, wherein said detecting means includes an optical bistable element at said intersecting region.

22. An apparatus as recited in claim 21, further including means for providing a sampling beam of light incident on said intersecting region whereby when said discriminating means determines said second state, said optical bistable element permits the sampling beam to pass through said intersecting region and otherwise blocks passage of the sampling beam.

23. An apparatus as recited in claim 15, wherein said discriminating means comprises an electronic thresh-holding means.

24. An apparatus as recited in claim 15, wherein said directing means includes means for directing light from said first and second energized ones of said light sources to intersect perpendicular to each other at said intersecting region.

25. A method of performing arithmetic operations in residue arithmetic comprising the steps of:
  (a) representing a first number in positionally encoded notation by energizing one of a first plurality of light sources, said light sources corresponding to residues of numbers modulo a given modulus such that said first number is represented by one of said first plurality of light sources;
  (b) representing a second number in positionally encoding notation by energizing one of a second plurality of light sources, said light sources of said second plurality of light sources corresponding to residues of numbers modulo said given modulus such that said second number is represented by one of said second plurality of light sources;
  (c) directing light from said energized light sources to intersect each other in an intersecting region; and
  (d) discriminating with a single detector positioned in said intersecting region between:
    (1) a first state, wherein a first level of light intensity is detected resulting from light transmitted to the detector from only one or none of said energized sources, and
    (2) a second state, wherein a second level of light intensity is detected resulting from light transmitted to the detector from both of said energized sources, wherein said first and second states indicate an output state of the arithmetic operation.

26. A method of performing logic operations in residue arithmetic comprising the steps of:
  (a) representing a first number in positionally encoded notation by energizing one of a first plurality of light sources, said light sources corresponding to residues of numbers modulo a given modulus such that said first number is represented by one of said first plurality of light sources;
  (b) representing a second number in positionally encoding notation by energizing one of a second plurality of light sources, said light sources of said second plurality of light sources corresponding to residues of numbers modulo said given modulus such that said second number is represented by one of said second plurality of light sources;
  (c) directing light from said energized light sources to intersect each other in an intersecting region; and
  (d) discriminating with a single detector positioned in said intersecting region between:
    (1) a first state, wherein a first level of light intensity is detected resulting from light transmitted to the detector from only one or none of said energized sources, and
    (2) a second state, wherein a second level of light intensity is detected resulting from light transmitted to the detector from both of said energized sources, wherein said first and second states indicate an output state of the logic operation.

* * * * *